May 26, 1931.　　　　G. A. LEMON　　　　1,806,692
RUMBLE SEAT CONSTRUCTION
Filed Aug. 29, 1929　　　2 Sheets-Sheet 2
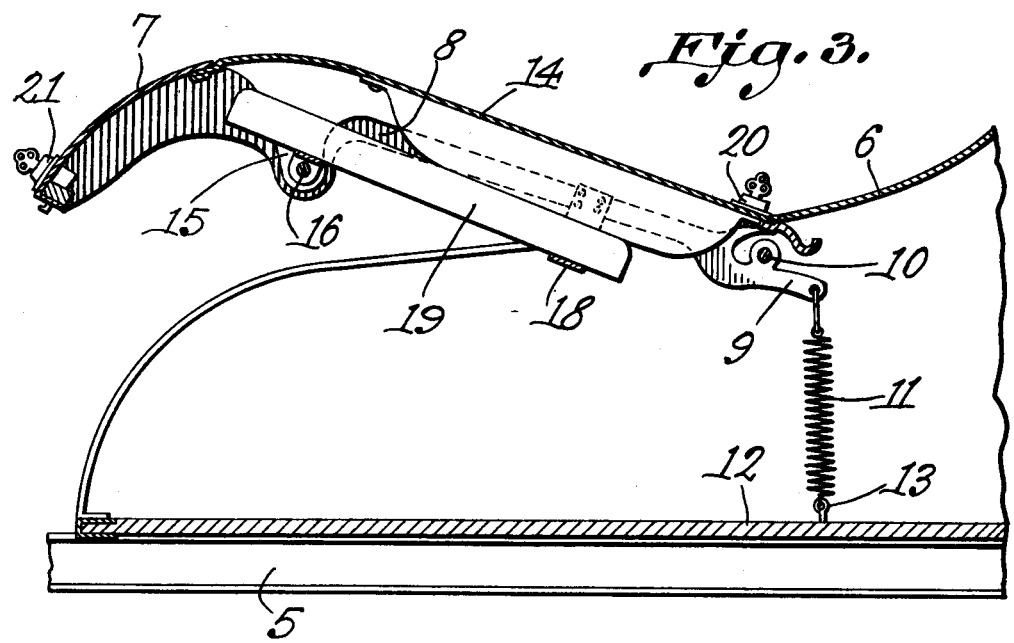
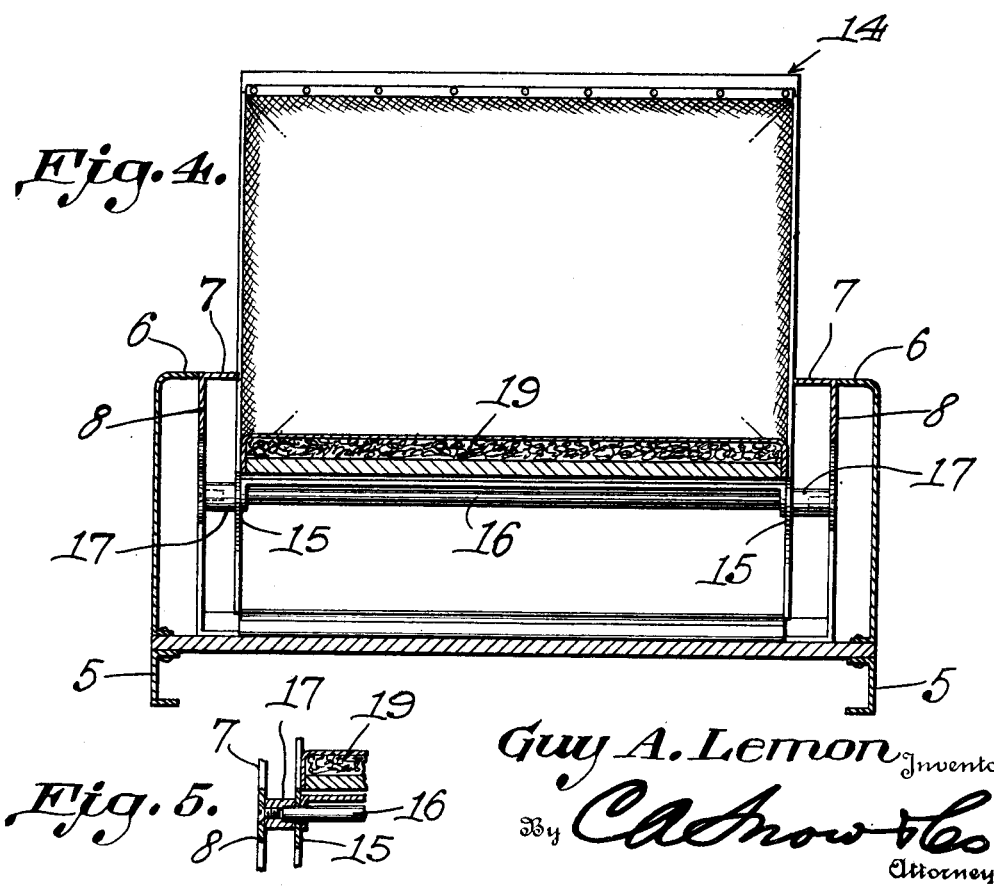

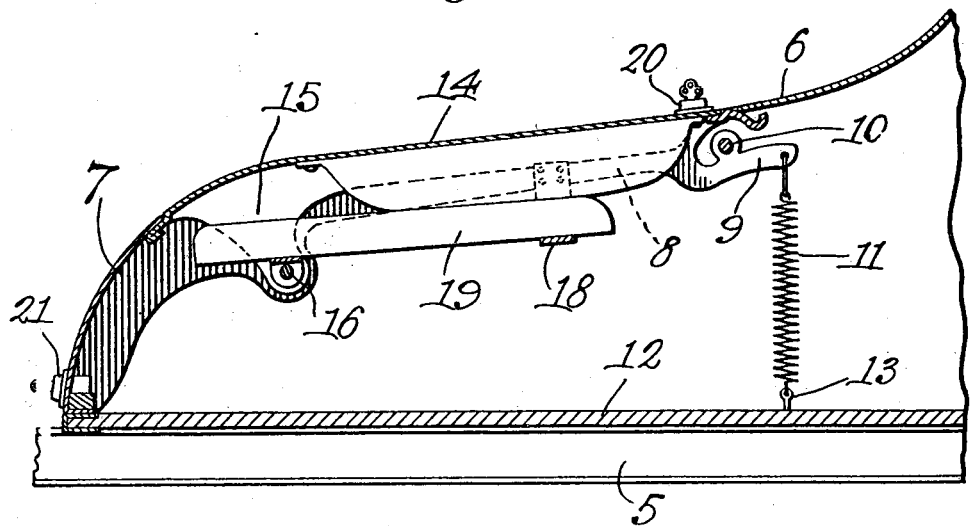
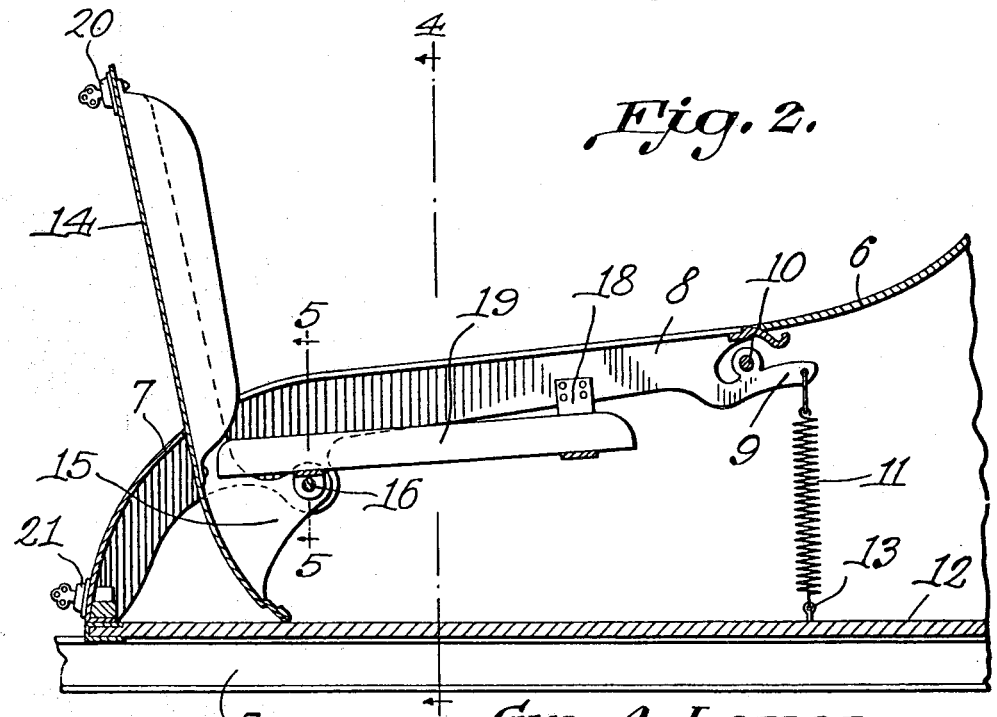

Patented May 26, 1931

1,806,692

UNITED STATES PATENT OFFICE

GUY A. LEMON, OF CHAPMAN, KANSAS

RUMBLE SEAT CONSTRUCTION

Application filed August 29, 1929. Serial No. 389,230.

This invention relates to motor vehicle body construction, and more particularly to body construction of the roadster type wherein a rumble seat is provided.

The primary object of the invention is to provide a rumble seat and rear deck of a motor vehicle, so constructed that the carrying space under the rear deck will not be greatly reduced by the rumble seat mounted therein.

An important object of the invention is to provide a rear deck for motor vehicles having a rumble seat supported thereby, the rear deck being of a construction to permit it to swing vertically allowing articles to be stored or carried thereunder.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a sectional view through the rear deck of a motor vehicle body construction.

Figure 2 is a sectional view through the rear deck of a motor vehicle body illustrating the rumble seat thereof, in its extended position.

Figure 3 is a sectional view through the rear deck of a motor vehicle body showing the rumble seat closed and the rear deck elevated to permit storing of articles under the rear deck.

Figure 4 is a sectional view taken on line 4—4 of Figure 2.

Figure 5 is a sectional view taken on line 5—5 of Figure 2.

Referring to the drawings in detail, the reference character 5 designates channel bars forming a part of the chassis of a motor vehicle, and to which the body of the vehicle is secured.

As shown, the vehicle body is of the roadster type and includes the usual rear deck 6 that embodies a hinged section 7 curved to carry out the lines of the body.

This hinged section 7 is formed with depending flanges 8 disposed along the side edges thereof and extended throughout the length of the hinged section, the flanges being formed with extensions 9 which are provided with openings to receive the rod 10 that extends across the body connecting the sides thereof. A coiled spring indicated at 11 is connected with each extension 9 and has its lower end anchored to the bottom 12 of the body, as at 13. Thus it will be seen that the spring exerts a slight pull on the hinged section of the deck balancing the section and permitting the section to be raised with facility.

The rear deck is cut away providing an opening for the section 14 that forms the back of the rumble seat, the back section being shown as provided with extensions 15 formed with openings to receive the rod 16 that has its ends mounted in the bearings 17 secured to the flanges 8 of the rear deck.

Thus it will be seen that the section 14 may be readily and easily swung from a closed to an open position, or vice versa. Brackets 18 are supported by the flanges 8 and provide seats for the seat portion 19 which has its rear end supported on the rod 16, as clearly shown by Figure 2 of the drawings.

When it is desired to use the rumble seat, it is obvious that the pivoted section 14 may be swung from a position as shown by Figure 1 of the drawings to a position as shown by Figure 2, and that if the rumble seat is not in use and it is desired to store or carry articles under the rear deck, it is only necessary to swing the entire rear deck upwardly to a position as shown by Figure 3, whereupon the articles may be readily placed thereunder.

It might be further stated that suitable locks such as indicated at 20 and 21 respectively, are used for locking the rumble seat or the rear deck in their inactive positions.

I claim:

A motor vehicle body construction including a pivoted rear deck having a cut out portion and having lateral downwardly extended flanges, a rod having its ends secured in openings of the flanges, brackets, a seat section mounted on the rod and resting on the brackets, a closure pivotally mounted on the rod and adapted to swing to a vertical position, providing a back for the seat, and said closure adapted to close the cut out portion.

In testimony that I claim the foregoing as my own, I have hereto affixed my signature.

GUY A. LEMON.